(12) United States Patent
Schober

(10) Patent No.: US 7,068,373 B2
(45) Date of Patent: Jun. 27, 2006

(54) PIEZOELECTRIC TRANSDUCER CONFIGURED FOR USE AS A PATH LENGTH CONTROL APPARATUS FOR AN OPTICAL DEVICE COMPRISING A CENTRAL VOID REGION

(75) Inventor: Christina M. Schober, Saint Anthony, MN (US)

(73) Assignee: Honeywell International Inc., Morristown, NJ (US)

( * ) Notice: Subject to any disclaimer, the term of this patent is extended or adjusted under 35 U.S.C. 154(b) by 188 days.

(21) Appl. No.: 10/376,663

(22) Filed: Feb. 28, 2003

(65) Prior Publication Data
US 2004/0169865 A1 Sep. 2, 2004

(51) Int. Cl.
*G01C 19/68* (2006.01)
*H01S 3/08* (2006.01)
(52) U.S. Cl. .................. 356/473; 372/107; 310/369
(58) Field of Classification Search ............ 356/469, 356/473; 372/94, 107; 310/367, 369
See application file for complete search history.

(56) References Cited

U.S. PATENT DOCUMENTS

| 4,160,184 A | * | 7/1979 | Ljung ................. 356/469 |
| 4,836,677 A | * | 6/1989 | Doran et al. ............ 356/469 |
| 5,162,870 A | * | 11/1992 | Toth .................. 356/469 |
| 5,420,685 A |   | 5/1995 | Podgorski |
| 6,515,403 B1 |   | 2/2003 | Schober et al. |
| 6,606,426 B1 | * | 8/2003 | Laor .................. 385/16 |
| 2003/0015944 A1 |   | 1/2003 | Schober |

FOREIGN PATENT DOCUMENTS

| EP | 0 293 528 A1 | 12/1988 |
| EP | 0 508 391 A2 | 10/1992 |
| JP | 07190785 A * | 7/1995 |

* cited by examiner

*Primary Examiner*—Gregory J. Toatley, Jr.
*Assistant Examiner*—Patrick J. Connolly
(74) *Attorney, Agent, or Firm*—Schiff Hardin LLP

(57) ABSTRACT

A path length control apparatus (PLC) for a ring laser gyroscope (RLG) provides a flattened surface for reflecting a laser beam. The flattened surface is achieved by providing a void behind the mirror in the laser beam area thus separating this area from stresses induced by temperature, voltage and/or displacement.

17 Claims, 8 Drawing Sheets

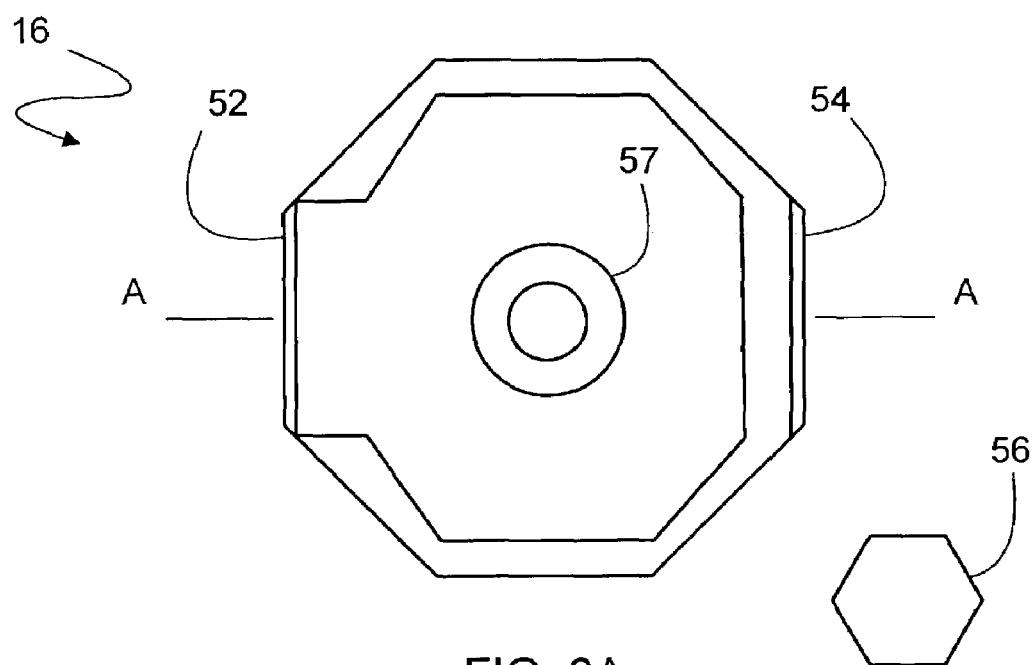
FIG. 6A
FIG. 6B
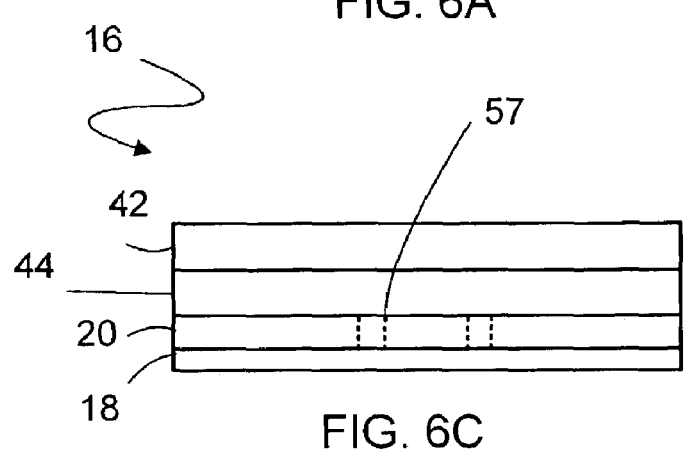
FIG. 6C
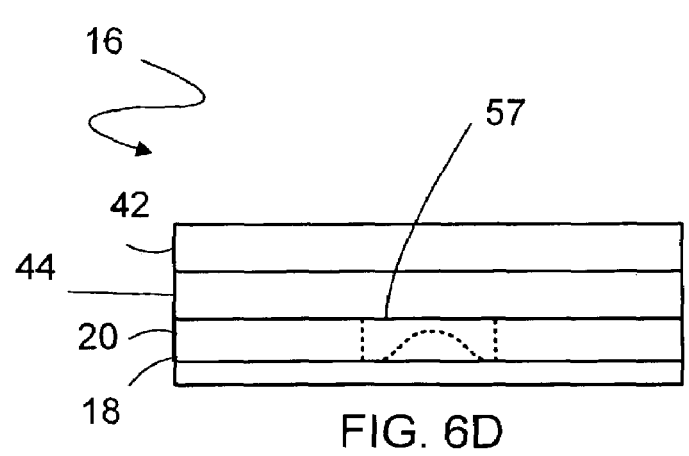
FIG. 6D

US 7,068,373 B2

PIEZOELECTRIC TRANSDUCER CONFIGURED FOR USE AS A PATH LENGTH CONTROL APPARATUS FOR AN OPTICAL DEVICE COMPRISING A CENTRAL VOID REGION

BACKGROUND OF THE INVENTION

1. Field of the Invention

The present invention relates to path length control apparatus (PLC) for optical devices and in particular to a physical design of the apparatus that removes the likelihood of imparted stresses on a mirror resulting in a flatter surface for reflecting a laser beam of a ring laser gyroscope (RLG).

2. Description of the Related Art

A ring laser gyroscope (RLG) is commonly used to measure the angular rotation of an object, such as an aircraft. Such a gyroscope has two counter-rotating laser light beams that move within a closed loop optical path or "ring" with the aid of successive reflections from multiple mirrors. The closed path is defined by an optical cavity that is interior to a gyroscope frame or "block." In one type of RLG, the block includes planar top and bottom surfaces that are bordered by six planar sides that form a hexagon-shaped perimeter. Three planar non-adjacent sides of the block form the mirror mounting surfaces for three mirrors at the corners of the optical path, which is triangular in shape.

Operationally, upon rotation of the RLG about its input axis (which is perpendicular to and at the center of the planar top and bottom surfaces of the block), the effective path length of each counter-rotating laser light beam changes and a frequency differential is produced between the beams that is nominally proportional to angular rotation. This differential is then optically detected and measured by signal processing electronics to determine the angular rotation of the vehicle. To maximize the signal out of the RLG, the path length of the counter-rotating laser light beams within the cavity must be adjusted. Thus, RLGs typically include a path length control apparatus (PLC), the purpose of which is to control the path length for the counter-rotating laser light beams for maximum output signal.

FIG. 1 illustrates one such known PLC 10 for a laser block assembly (LBA) 12 of an RLG, such as that described as prior art in U.S. Pat. No. 6,515,403, herein incorporated by reference. This PLC 10 includes a piezoelectric transducer (PZT) 16 which is secured to a mirror 18 via an epoxy-based adhesive 20. The epoxy adhesive 20 completely covers the interface (defined by a lower surface 22 of the PZT 16 and an upper surface 24 of the mirror 18 between the PZT 16 and the mirror 18. The mirror 18 is secured to a mirror mounting surface 26 of the optical LBA 12. The mirror 18 communicates with laser bores 32 (only partially shown) of an optical cavity 34 (only partially shown) of the LBA 12. The bores 32 form a portion of the closed loop optical path 38 defined by the optical cavity 34. As seen in FIG. 1, the mirror 18 reflects counter-rotating laser light beams 40 at its respective corner of the closed loop optical path 38.

A conventional PZT 16 (FIGS. 2 & 3A) is defined by a pair of piezoelectric elements 42 and 44. The PZT 16 takes an applied voltage delivered by a regulated voltage source (not shown), in response to a signal provided by a detector (not shown) that monitors the intensity of the light beams 40, and turns this voltage into small but precisely controlled mechanical movement in a direction perpendicular to a top surface of the PZT 16. This mechanical movement of the PZT 16 affects translational movement of the mirror 18, and thereby controls the laser light beam path length.

FIG. 3B illustrates a known multi-layered PZT, such as that described by U.S. Pat. No. 6,515,403, in which a stack of alternating negative and positive co-fired ceramic layers is provided. Co-fired ceramic layers are those that are "fired", when they are made, together, as opposed to being made separately and then later bonded together. These may then form a resultant multilayered stack.

This structure may include a top layer 62, a bottom layer 68, and alternating negative 64 and positive 66 layers. This multi-layer PZT 16 has contacts, which are electrically connected to other layers within the multi-layer PZT 16, formed directly on the top layer of the PZT 16, and the regulated voltage source can be coupled directly to the PZT 16 at the top layer contacts. The multi-layer PZT 16 includes a plurality of ceramic layers 62, 64, 66, 68 so as to form a stack in which each ceramic layer has first and second opposing surfaces.

The plurality of ceramic layers includes a top layer 62 at a first end of the stack having a top conductive pattern formed on its first surface. The top conductive pattern includes a negative contact and a positive contact.

The plurality of ceramic layers 62, 64, 66, 68 also includes at least one poled ceramic layer 64 having a conductive pattern formed on its first surface. The plurality of ceramic layers 62, 64, 66, 68 include additional poled ceramic layers 66, 68 having alternating conductive patterns formed on the first surface thereof. In such a multi-layer configuration, the layers are more tightly coupled to the mirror since they lack extra epoxy layers. Almost all the distortion in the ceramic is directly imparted into the mirror 18.

Sometimes, with conventional PZTs 16 in which the PLC driver is bonded directly to the transducer mirror, curvature in the mirror due to stresses or other factors may cause multimoding of the laser beam. In multi-layer PZTs 16, this occurs more often, i.e., in approximately 30–50% of the LBAs. This is particularly true, e.g., because only thin layers 20 (such as 0.0005" to 0.001") of epoxy are typically used to attach the mirror 18 to the driver. This multimoding interferes with the laser mode that the LBA uses to get an accurate count data (and therefore navigation data).

The problem of multimoding is described in more detail below.

Multimoding occurs when a higher order transverse mode becomes resonant with the fundamental $TEM_{00}$ (Transverse Electro-Magnetic) mode. The fundamental $TEM_{00}$ mode is characterized by an intensity distribution, which can mathematically be described by a Gaussian function centered on the direction of propagation. Mathematically, the intensity distribution is $$I(x, y) = I_0 \exp\left[-\frac{x^2 + y^2}{\omega(z)^2}\right]$$

Here $I_0$ is the intensity in W/cm² at the center of the beam and $\omega$ is the $1/e^2$ intensity radius. $\omega$ is a function of the distance, z, from a point of minimum radius called the beam waist.

Higher-order modes, designated $TEM_{mn}$, where m>0 and/or n>0, have a more complicated mathematical description. Briefly, the $TEM_{10}$ mode can be described as a set of headlights, that is, two spots side-by-side. The $TEM_{01}$ is similar but rotated by 90°. The $TEM_{11}$ mode has four spots—essentially two sets of headlights, one on top of the other. Note that all three of these modes have a null point (or zero energy) at the center of the beam. This is characteristic of any mode with an odd index. Modes that have both indices (m and n) being even always have energy at the center of the beam. The mode index can be determined by counting the number of null regions along a particular direction, either x or y.

Higher-order modes have larger spatial areas than do the fundamental mode. Hence an internal body aperture can be used to against them. That is, an aperture of the correct size adds little loss to the fundamental mode, but adds measurable loss to higher-order modes whose beams are spatially offset from the beam of the fundamental mode. The higher the mode numbers, the more loss added. So, for example, in one type of device, the internal apertures add about 10 ppm loss to the fundamental mode and 100 ppm loss to the $TEM_{01}$ and $TEM_{10}$ modes.

If, however an aperture diameter were scaled to a larger RLG aperture diameter, then it would be very difficult to build any hardware, since the alignment would be very difficult to achieve with that small of an aperture (e.g., on the order of 0.032"). But a slightly larger aperture diameter provides less than 1 ppm loss for the $TEM_{01}$ and $TEM_{10}$ modes. The result is that these modes lase very well and one must attempt to reduce them with an external aperture placed in front of the LIM (Laser Intensity Monitor) sensor.

The LIM aperture discriminates against higher order modes and allows the PLC loop to lock onto the fundamental mode as it is presented to the LIM detector as the most intense mode. It is fortunate that higher order modes lase at a different frequency than does the fundamental. For example, the $TEM_{10}$ mode lases approximately mid-way between one fundamental mode and another (representing path lengths that differ by one optical wavelength). Hence if the PLC loop is controlling on a fundamental mode, the $TEM_{10}$ mode will not lase. The $TEM_{01}$, the $TEM_{20}$ and the $TEM_{02}$ modes all are within approximately 0.1 modes from the fundamental. Again, when the loop is controlling on the fundamental mode none of these three will lase.

Thus, the lowest, higher-order transverse modes are discriminated against because they are separated in frequency from the fundamental modes, and other higher-order modes are discriminated against primarily by using the internal body aperture and secondarily by frequency separation.

The problem is that the frequency separation between the fundamental mode and any higher-order mode is a function of mirror curvature. The higher the mode indices, the stronger the function.

The wedge (the mirror having the readout detector on it—which is a second mirror distinguished from the first transducer mirror attached to the cofired driver) is flat, so this does not pose a problem. A curved third mirror's curvature is specified to a narrow range in which there are likely no problems. The piezoelectric drive transducer is nominally flat, but in fact, actually changes curvature.

Problems arise when a higher-order transverse mode has no frequency separation between itself and the fundamental mode. In that situation, the only potential solution is the aperture, and if the aperture doesn't provide sufficient discrimination (i.e., loss), then the higher order mode dominates and essentially causes error in the rate output.

There are 10 transverse modes with indices m and n under 10 which resonate with the fundamental as the transducer radius of curvature changes from −0.2 m to −2.0 m. One of these is the $TEM_{41}$ mode. Since it has one odd index, it has an intensity null at the center, so when it lases, one would expect the LIM to drop.

For co-fired multi-layer data, FIG. 9 shows an LIM plot (versus temperature) from a run that had bad rate output. Specifically, it shows an LIM v. Temperature LIM plot of LBA with 4-layered cofired driver without pads. Note the LIM spikes upon return from a hot temperature, between the range of 145° F. and 160° F.

The bad rate data was coincident with the LIM spikes observed at temperatures between 145° F. and 160° F. on the return from a hot temperature. Note that these spikes are not simply single data points, but involve a somewhat gradual decrease, followed by an increase.

FIGS. 10 and 11 show mode scans from the same gyro in the same thermal region. The FIG. 10 graph is a mode scan of LBA with 4-layer cofired ceramic. The left most 0—0 mode shows evidence of "multi-moding." As compared to FIG. 11, here the higher order transverse mode has moved somewhat to the right side of the mode. FIG. 11 is a graph showing a Mode Scan of LBA with 4-layer cofired ceramic. The left most 0—0 mode shows evidence of "multi-moding."

The left most mode of FIG. 10 indicates that it is lower in intensity than the rest and that there is actually a slight drop at the center. In FIG. 11, the same mode shows an anomaly slightly to the right of the peak. The difference between FIGS. 10 and 11 is that they were taken at different times during which the temperature was dropping. In fact, if one observed the oscilloscope during this period, one could see the anomaly move across the fundamental mode from left to right.

What appears to be happening is that in the condition of FIG. 11, the radius of curvature of the transducer is exactly correct to allow a transverse mode to have exactly the same frequency as the fundamental; hence the transverse mode lases and decreases the intensity of the fundamental mode. It lases because the internal body aperture is not small enough to totally discriminate against this mode. Since the energy of the transverse mode is more spread out spatially than that of the fundamental, the LIM sensor receives less energy through the LIM aperture and therefore the LIM voltage drops. In the condition of FIG. 11, the transducer curvature has changed somewhat as has the frequency separation between the transverse and the fundamental modes. The transverse mode still lases, but only when the PLC loop is detuned sufficiently.

Note that the strength of the LIM drop most probably is a function of the internal body aperture (and the beam alignment within the aperture). If the aperture was larger (and it wouldn't have to be much larger), the higher-order mode would lase more strongly, the fundamental mode would lase less strongly and the LIM would drop further. This cautions against allowing the body aperture to become much larger.

The reason the above effect more readily occurs with co-fired piezoelectric transducer drivers is because the co-fired drivers change the normal curvature of the transducer. Two reasons for this change are 1) stronger coupling between the ceramics and mirror, and 2) the increased "non-flatness" of the co-fired drivers.

SUMMARY OF THE INVENTION

The invention is directed to a piezoelectric transducer configured for use as a path length control apparatus of an optical device, comprising a void located in a central region of the piezoelectric transducer, mirror, or adhesive.

The present invention implements a physical construction of the PLC driver that removes the likelihood of imparted stresses, and therefore mirror curvature at the location where the laser beam is reflected. A voided area is provided behind the mirror in the laser beam area thus separating this area from the stresses induced by temperature, voltage and/or displacement or any other similar factor. Such a void may be implemented by a hole, a recessed area, a donut-shaped element(s) or a voided epoxy area to relax the mirror in the laser beam area. Or the mirror itself may be recessed behind the laser beam area. Thus the invention separates and relaxes the stresses imparted from the drive mechanism at the reflected laser beam area, and allows the physical motion of the mirror to provide thermal compensation and laser intensity peaking without unwanted side effects of degenerate modes. Note that the term "void" does not necessarily mean a pure vacuum or gas, but can encompass any material that achieves the separation and relaxation of stresses imparted from the drive mechanism at the reflected laser beam area. Also, the void can be provided in any combination of the above-mentioned elements, e.g., the mirror and the adhesive.

Use of a conventional PLC is different than the use of a multi-layer stack such as that described in U.S. Pat. No. 6,515,403 having a stack comprising epoxy/electrode/epoxy/ceramic/epoxy/electrode/epoxy/ceramic/epoxy/ electrode/epoxy/PWB. Such a multi-layer stack imparts significant curvature stress at the mirror center. The conventional PLC imparts less curvature stress due to a self-leveling of the drive assembly resulting from cushioning layers of epoxy. However, such a conventional PLC has increased costs and assembly associated with it and thus may not be desirable in some circumstances. Also, the conventional PLC may still impart some degree of stress in the mirror as well.

Since the laser beam is reflected from a flatter surface, laser modes that are degenerate to the $TEM_{00}$ mode are separated adequately to not interfere during operation. Nonetheless, the present invention can also be utilized with the conventional PLC to improve performance.

The inventive solution provides a much higher yield to the co-fired driver, which in turn has better performance over temperature than the conventional drivers described above (vpm over temperature and average vpm; vpm is "volts per mode", or the amount of voltage needed to move the mirror one laser mode or wavelength; if one uses less voltage to move one mode, and one is limited in supply voltage, one gets a larger range of motion with a lower vpm driver). The inventive stress relieved co-fired driver is also a significant improvement to cost and factory space over other solutions involving additional layers. Various other approaches to the inventive solution were tried, but no other approach (including smaller aperture, adding epoxy/electrode layer, flatness of parts, preload of assembly, modulation change, drive circuitry) was able to eliminate the multi-moding.

DESCRIPTION OF THE DRAWINGS

The invention is described ingreater detail below with respect to the drawings.

FIG. 6A is a pictorial top view of another embodiment of the inventive PZT having a donut-shaped element;

FIG. 6B is a pictorial top view of a regular polygon-shaped void of a PZT;

FIG. 6C is a pictorial side view of a possible cross-section illustrating use of the void element according to FIG. 6A;

FIG. 6D is a pictorial side view of another possible cross-section illustrating use of the void element according to FIG. 6A;

DETAILED DESCRIPTION OF THE PREFERRED EMBODIMENTS

Various embodiments of the invention are envisioned. The void may have a perimeter shaped as a circle, regular polygon, or a symmetrical or asymmetrical shape. The void may simple be a recessed area behind an area of the mirror at which an energy beam strikes. In one embodiment, the piezoelectric transducer has a width of between 0.1" and 1.0"; and the void has a width of between 0.01" and 0.4". The piezoelectric transducer may comprise a first layer located on a top side of the piezoelectric transducer; and a second layer located on a bottom side of the piezoelectric transducer and configured to attach to a mirror, the mirror attaching on a side of the second layer opposite the first layer. In an embodiment, the thickness of the first and second layers may be between 0.01" and 0.1". In an embodiment, the void may have a depth such that it extends partially through the second layer. This void depth may be between 0.001" and 0.05". Whatever the depth, the void may extend fully through the second layer or both the first layer and the second layer. An embodiment is envisioned in which the void is a part of an attached element that attaches to a bottom side of the piezoelectric transducer. This element may have a flattened donut shape, having a void in its center. The void may also be located in an adhesive layer. Alternately, the attached element itself may reside in the adhesive layer.

The overall construction of an embodiment of the piezoelectric transducer arrangement configured for use as a path length control apparatus of an optical device may comprise a first layer located on a top side of the piezoelectric transducer; a second layer located below the first layer; an adhesive layer located adjacent to the second layer and on a side opposite the first layer, the adhesive having a void located in a central region of the arrangement; and a mirror located adjacent to the adhesive layer and on a side opposite the second layer. Alternately, this arrangement may comprise: a first layer located on a top side of the piezoelectric transducer; a second layer located below the first layer; an adhesive layer located adjacent to the second layer and on a side opposite the first layer; and a mirror located adjacent to the adhesive layer and on a side opposite the second layer, the mirror having a void that is located in a central region of the arrangement and that extends part way from a back surface of the mirror that attaches to the adhesive layer to a location within the mirror over an area of the mirror that reflects an energy beam. These embodiments will be discussed in more detail below.

Figure 1:
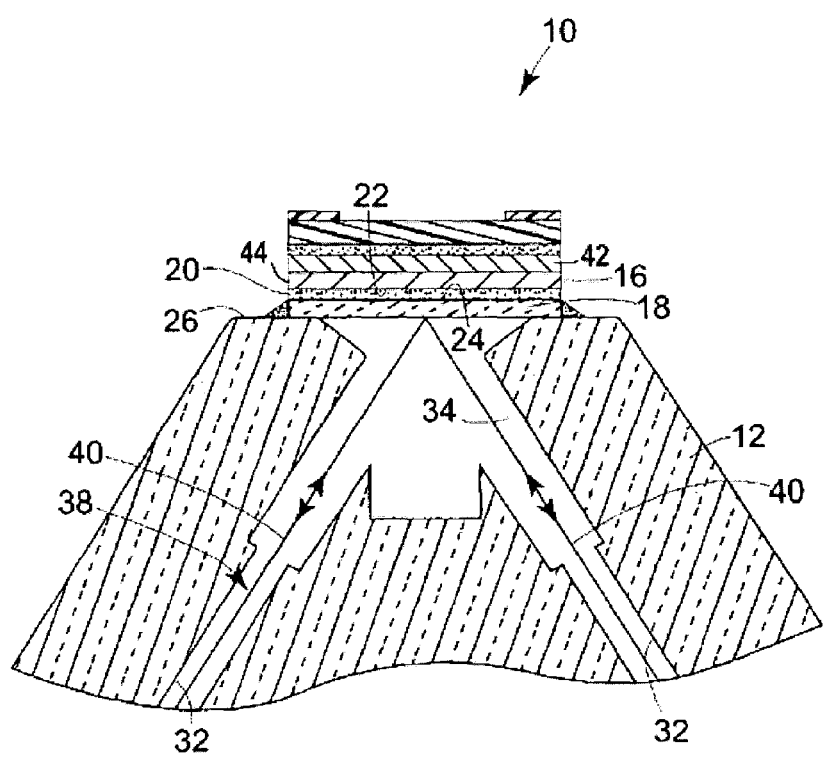
FIG. 1 is a side cross-section view of a known PLC including a conventional PZT.
Figure 2:
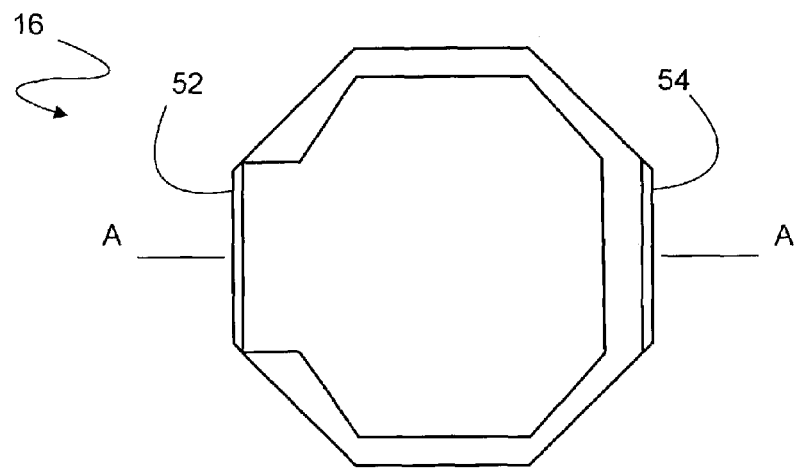
FIG. 2 is a simplified pictorial top view of a known PZT.
Figure 3A:
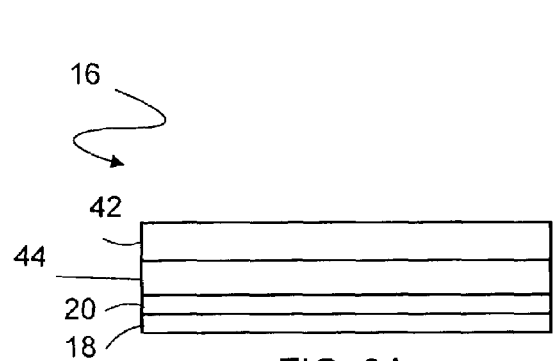
FIG. 3A is a simplified pictorial side view of a known conventional PZT.
Figure 3B:
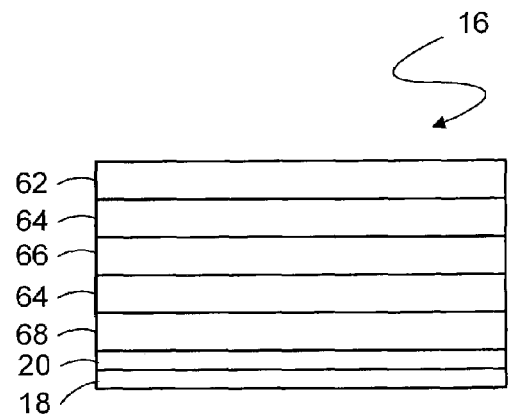
FIG. 3B is a simplified pictorial side view of a known co-fired multi-layer PZT.
Figure 4:
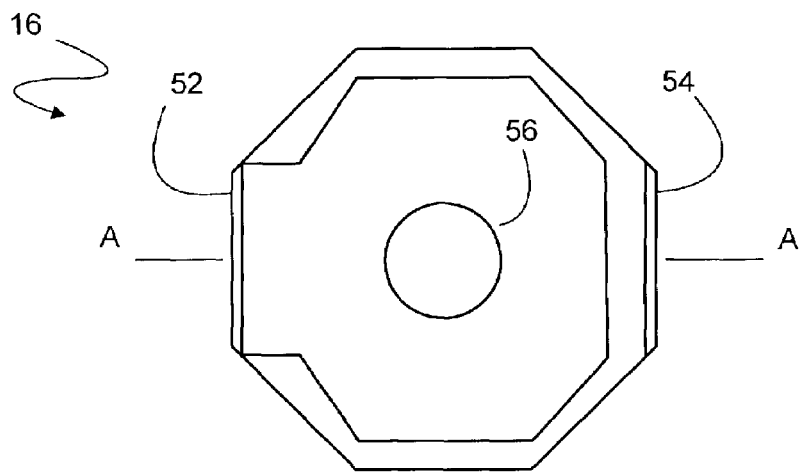
FIG. 4 is a pictorial top view of the inventive PZT having a circular-shaped void.
Figure 5A:
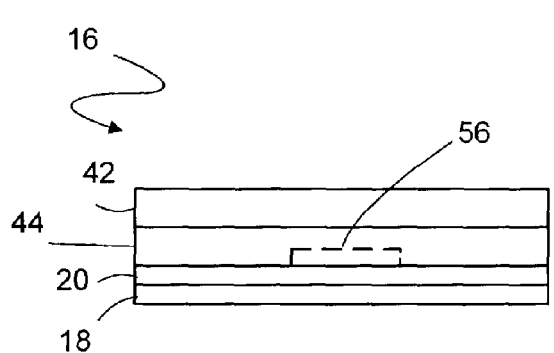
FIG. 5A is a pictorial side view of an inventive conventional PZT having a void extending partially through a layer of the PZT.
Figure 5B:
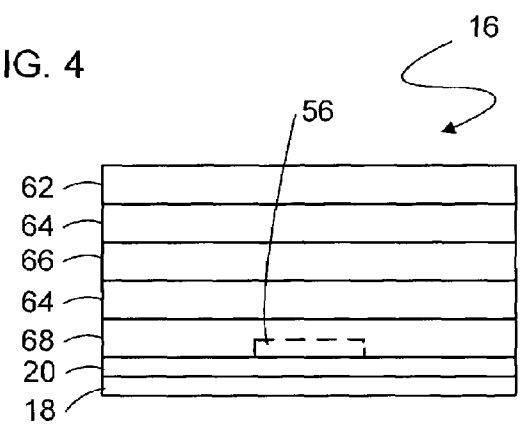
FIG. 5B is a pictorial side view of an inventive co-fired multi-layer PZT having a void extending partially through a layer of the PZT.

An embodiment of the inventive PZT 16 is shown in FIG. 4. FIGS. 4, 5A and 5B illustrate a design similar to that shown in FIG. 2, comprising a positive terminal 54 and a negative terminal 52, as well as a pair of piezoelectric elements 42 and 44 (for the conventional variation) or a stack of piezoelectric elements (62, 64, 66, 68). However, this embodiment also has a void 56 region/area that is roughly centered at a position generally co-linear to a perpendicular of the mirror at a point at which the laser beam 40 strikes the mirror 18.

In the embodiment illustrated in FIG. 4, this void 56 may be circular in shape. An exemplary embodiment might include a PZT 16 having an overall diameter of approximately 0.63", where each of the layers 42, 44 may be approximately 0.009" thick. The circular void 56 may have a radius of approximately 0.06". The actual dimensions are dependent on the amount of voltage available and the flexibility (ease of driving the mirror) of the mirror itself. One skilled in the art would be able to adjust these nominal values accordingly. The adhesive layer 20 may be a few tenths of a mil to a few mils thick, and the mirror 18 may be 0.020" thick. These dimensions are somewhat arbitrary, but what is important is that the void is of a large enough diameter so that stresses are minimized in the region of the mirror 18 at which the laser beam 40 reflects and thus minimizes curvature.

Figure 5C:
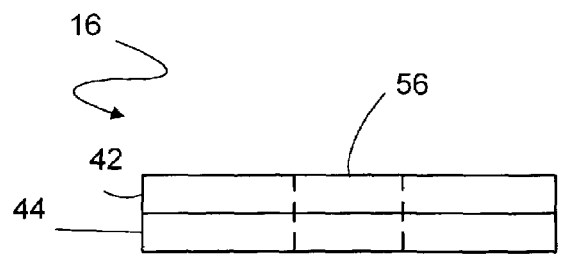
FIG. 5C is a pictorial side view of an additional embodiment of an inventive conventional PZT having the void extend through multiple layers of the PZT.

FIG. 5A is a side view of a conventional PZT 16 with an adhesive layer 20 and mirror 18 where the void 56 has a depth that extends partially through one of the layers 44. FIG. 5B illustrates the same configuration for a multi-layer PZT 16 in which the void 56 extends partially through one of the layers 68. The depth of the void 56 is not critical, but it should be deep enough so that the adhesive layer 20 does not adhere the mirror 18 to the PZT 16 in the region of reflection. FIG. 5C illustrates the conventional PZT in which the void 56 extends completely through both PZT layers 42, 44. In both embodiments shown in FIGS. 5A and 5B, the void could extend to any depth and through any number of layers, provided there is no direct linkage between the mirror 18 (the portion in front of the laser beam 40 contact), the adhesive 20 and a layer of the PZT 44, 68.

FIG. 6A illustrates a PZT 16 with a donut-shaped element 57 that could look like a washer or have a torroidal shape. This central portion of the donut-shaped element 57 could have a cylindrically-shaped void (FIG. 6C) or it could have a rounded contour with smooth transition edges (FIG. 6D). There is no requirement that this element 57 be round or any other particular shape. What is important is that it has a void region that serves to separate the central part of the mirror 18 at which an energy beam is present from the rest of the assembly.

FIG. 6B illustrates a polygon-shaped void 56. It should be understood that any symmetric, asymmetric, geometric or irregularly shaped void could be used to produce the isolating effect. It is important that the void 16 separates and relaxes the stresses imparted from the drive mechanism at the reflected laser beam area, and allows the physical motion of the mirror 18 to accommodate for thermal compensation and laser intensity peaking without the unwanted side effects of degenerate modes. The void accomplishes this because the center mirror area where the beam is reflected is free without any direct coupling from behind the mirror. The only constraints to the mirror center are along the edges of the recessed area. It effectively de-couples the ceramic imparted distortion from affecting the curvature of the mirror at the center point.

Figure 7:
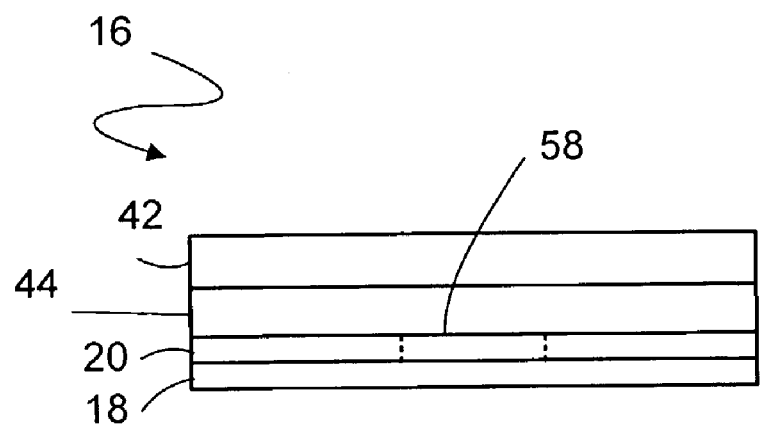
FIG. 7 is a pictorial side view of a PZT with attached mirror in which the void is in the epoxy layer.
Figure 8:
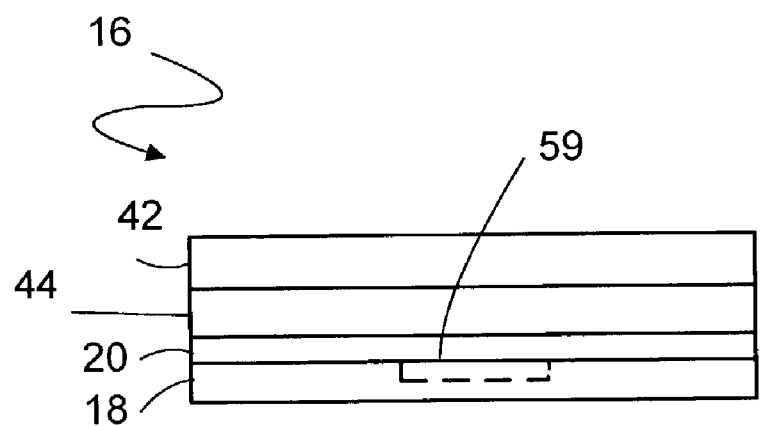
FIG. 8 is a pictorial side view of a PZT with attached mirror in which the void is in a part of the mirror.
Figure 9:
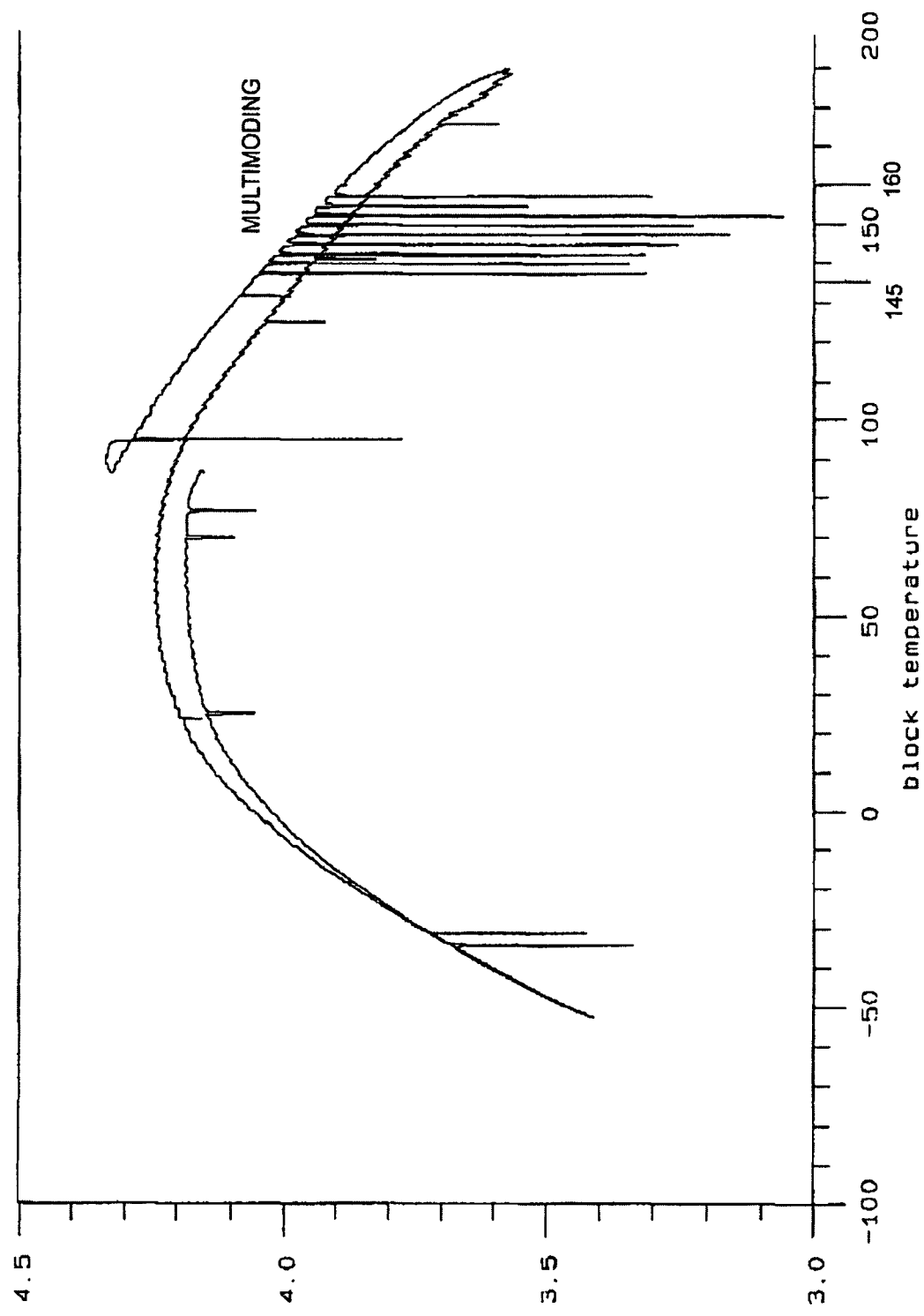
FIG. 9 is a graph showing an LIM v. Temperature LIM plot of LBA with 4-layered cofired driver without pads.
Figure 10:
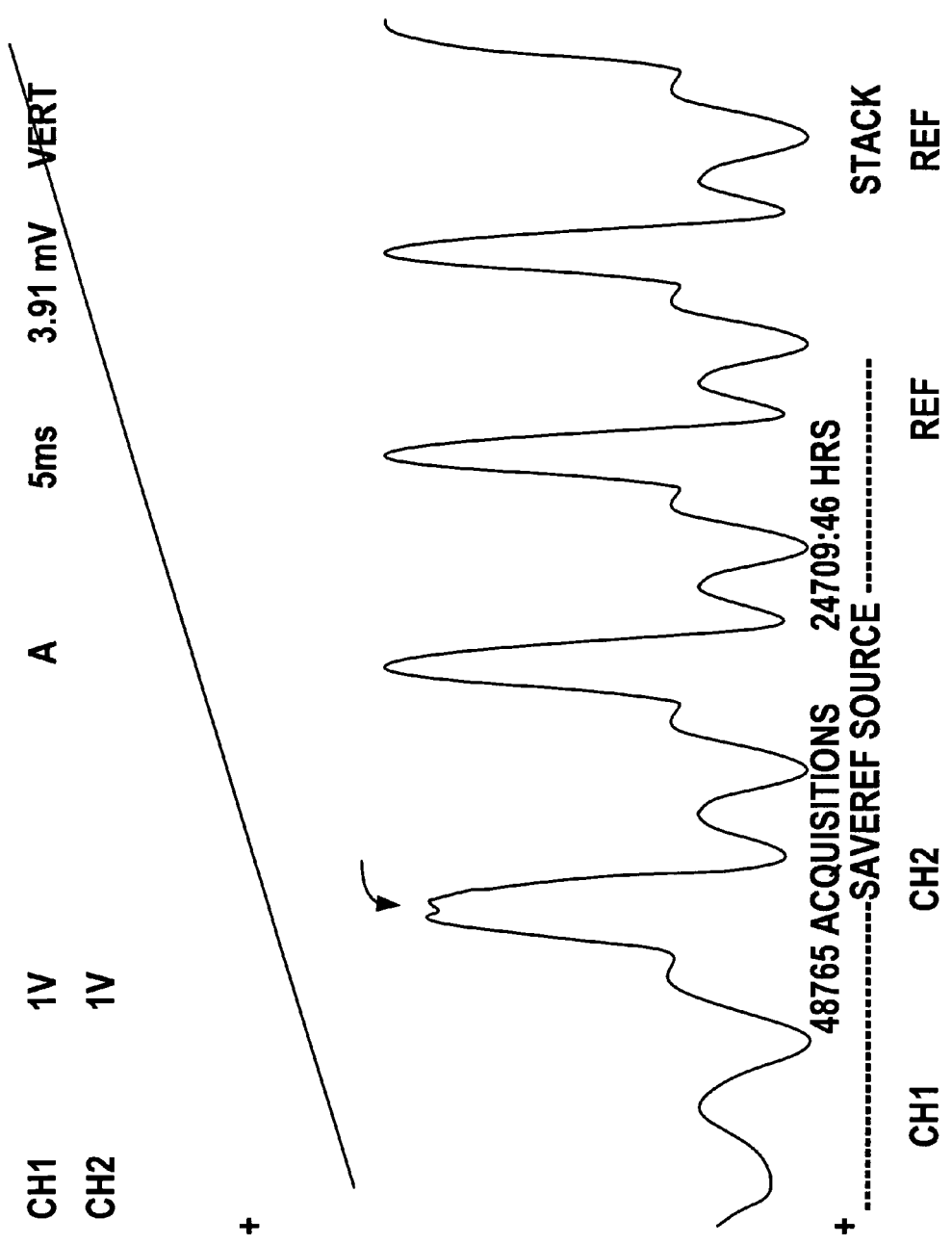
FIG. 10 is a graph showing a mode scan of LBA with 4-layer cofired ceramic.
Figure 11:
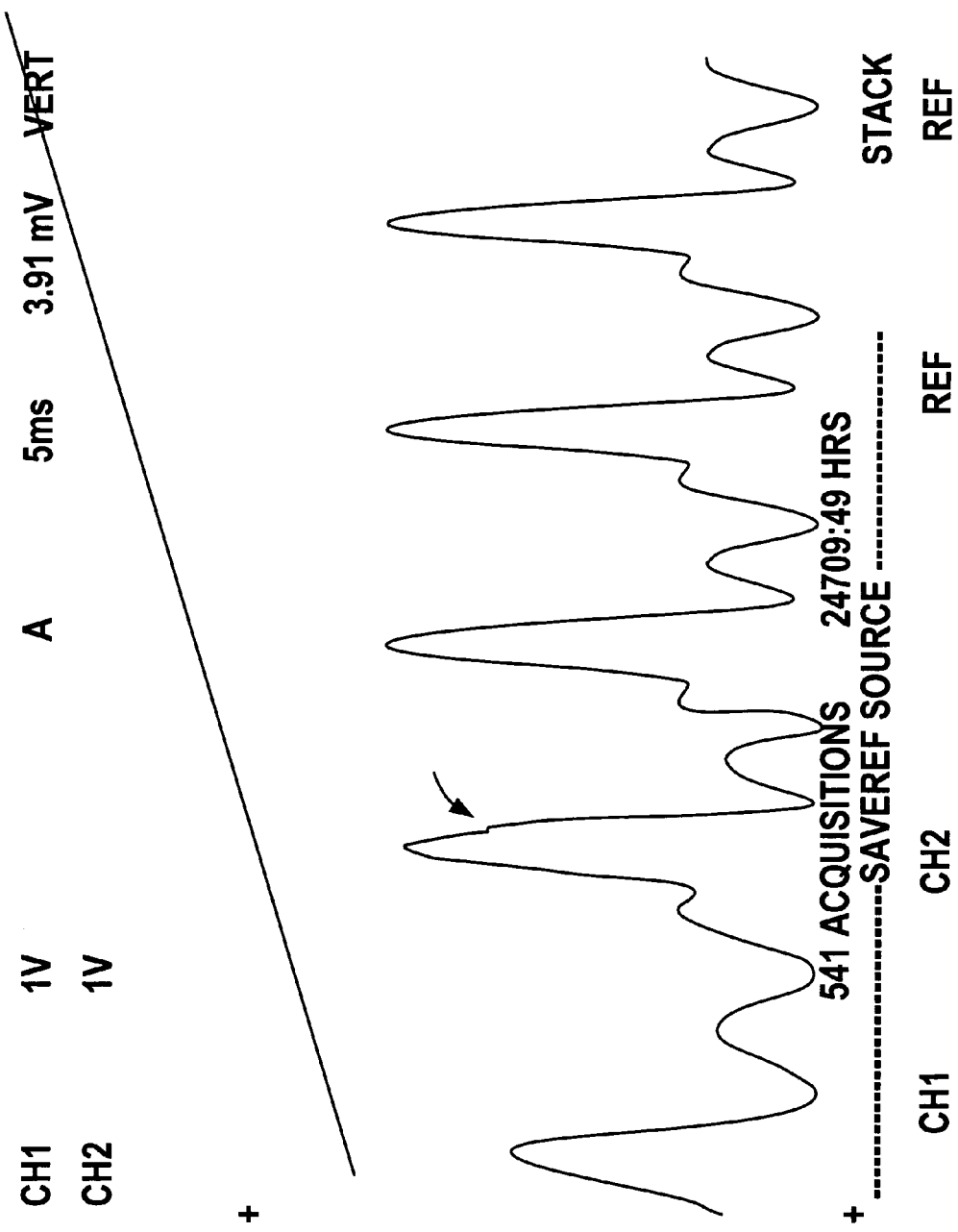
FIG. 11 is a graph showing a mode scan of LBA with 4-layer cofired ceramic.

This de-coupling can also occur based on an embodiment in which the adhesive layer 20 (FIG. 7) comprises a void 58. Additionally an embodiment can include (FIG. 8) a void region 59 in a portion of the mirror 18 itself, although obviously this void region 59 cannot extend through the entire thickness of the mirror.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The various aspects of the invention may be combined in any way that achieves the objectives of the invention. For example, the hexagonal void shape 56 of FIG. 6B could be present in a completely through-the-layers design 42, 44 or a be the perimeter shape of the element 57 according to FIG. 6A.

The particular implementations shown and described herein are illustrative examples of the invention and are not intended to otherwise limit the scope of the invention in any way. For the sake of brevity, conventional configurations, and other functional aspects of the systems (and components of the individual operating components of the systems) may not be described in detail. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A piezoelectric transducer assembly configured for use as a path length control apparatus of an optical device, comprising:

a piezoelectric transducer having a top planar surface and a bottom planar surface and a thickness that is less than a length or width of the top and bottom surfaces; and a mirror attached directly or indirectly to the piezoelectric wafer;

the assembly comprising a void located in a central region of the piezoelectric transducer between the top and bottom planar surfaces, the central region including the center of the piezoelectric transducer as defined approximately by its top or bottom planar centroid.

2. The piezoelectric transducer assembly according to claim 1, wherein the void has a perimeter shaped as a circle.

3. The piezoelectric transducer assembly according to claim 1, wherein the void has a perimeter shaped as a regular polygon.

4. The piezoelectric transducer assembly according to claim 1, wherein the void is a recessed area.

5. The piezoelectric transducer assembly according to claim 1, wherein:

the piezoelectric transducer has a width of between 0.1" and 1.0"; and the void has a width of between 0.01" and 0.4".

6. The piezoelectric transducer assembly according to claim 1, further comprising:
   a first layer located on a top side of the piezoelectric transducer; and
   a second layer located on a bottom side of the piezoelectric transducer and configured to attach to the mirror, the mirror attaching on a side of the second layer opposite the first layer.

7. The piezoelectric transducer assembly according to claim 6, wherein the thickness of the first and second layers combined is between 0.01" and 0.1".

8. The piezoelectric transducer assembly according to claim 6, wherein the void has a depth such that it extends partially through the second layer.

9. The piezoelectric transducer assembly according to claim 8, wherein the void has a depth of between 0.001" and 0.05".

10. The piezoelectric transducer assembly according to claim 6, wherein the void has a depth such that it extends fully through the second layer.

11. The piezoelectric transducer assembly according to claim 6, wherein the void has a depth such that it extends fully through the first layer and the second layer.

12. A piezoelectric transducer assembly configured for use as a path length control apparatus of an optical device, comprising:
   a piezoelectric transducer having a top planar surface and a bottom planar surface;
   an attached element attached to a bottom side of the piezoelectric transducer, wherein the attached element comprises an unfilled void region, the void region lying along a central axis perpendicular to the top planar surface of the piezoelectric transducer, the central region including the center of the piezoelectric wafer as defined approximately by its top or bottom planar centroid, the central axis passing through the center of the piezoelectric wafer.

13. The piezoelectric transducer assembly according to claim 12, wherein the attached element has a flattened donut shape.

14. The piezoelectric transducer assembly according to claim 12, further comprising:
   an adhesive layer, wherein the attached element resides within the adhesive layer.

15. A piezoelectric transducer assembly configured for use as a path length control apparatus of an optical device, comprising:
   a piezoelectric transducer having a top planar surface and a bottom planar surface and a thickness that is less than a length or width of the top and bottom surfaces; and
   a mirror attached directly or indirectly to the piezoelectric wafer below the bottom planar surface to that its top surface faces the bottom planar surface of the piezoelectric transducer;
   the assembly comprising a void located in a central region of the piezoelectric transducer along a central axis perpendicular to the top planar surface, the central region including the center of the piezoelectric wafer as defined approximately by its top or bottom planar centroid, the central axis passing through the center of the piezoelectric wafer.

16. The piezoelectric transducer assembly according to claim 15, wherein the void is located on the top surface of the mirror.

17. The piezoelectric transducer assembly according to claim 15, further comprising:
   an adhesive layer between the piezoelectric transducer bottom planar surface and the top surface of the mirror, the void being located within the adhesive layer.

* * * * *